(12) United States Patent
Lowe et al.

(10) Patent No.: US 9,441,686 B2
(45) Date of Patent: Sep. 13, 2016

(54) BRAKE ASSEMBLY

(71) Applicant: GM GLOBAL TECHNOLOGY OPERATIONS LLC, Detroit, MI (US)

(72) Inventors: Brent D. Lowe, Milford, MI (US); Mark T. Riefe, Brighton, MI (US); Omar S. Dessouki, Beverly Hills, MI (US); Mohan Sundar, Troy, MI (US); Chia N. Yang, Wixom, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 216 days.

(21) Appl. No.: 13/901,646

(22) Filed: May 24, 2013

(65) Prior Publication Data

US 2013/0256069 A1    Oct. 3, 2013

Related U.S. Application Data

(62) Division of application No. 12/794,815, filed on Jun. 7, 2010, now Pat. No. 8,469,159.

(51) Int. Cl.
| | |
|---|---|
| *F16D 65/095* | (2006.01) |
| *F16D 55/22* | (2006.01) |
| *F16D 55/227* | (2006.01) |
| *F16D 65/00* | (2006.01) |
| *F16D 55/00* | (2006.01) |

(52) U.S. Cl.
CPC .......... *F16D 65/095* (2013.01); *F16D 55/227* (2013.01); *F16D 65/0006* (2013.01); *F16D 2055/0008* (2013.01)

(58) Field of Classification Search
CPC .. F16D 65/0006; F16D 65/18; F16D 65/092; F16D 65/095; F16D 2069/004; F16D 2069/0441; F16D 69/0408; F16D 2055/0016; F16D 2055/0008; F16D 2055/0091; F16D 2055/002; F16D 55/22; F16D 55/226; F16D 55/227; F16D 55/228
USPC ........... 188/73.1, 73.31, 73.37, 73.38, 73.36, 188/378, 218 XL, 73.39, 73.45, 71.12, 188/73.47, 73.44
See application file for complete search history.

(56) References Cited

U.S. PATENT DOCUMENTS

| | | | | |
|---|---|---|---|---|
| 4,002,226 A | * | 1/1977 | Rainbolt | F16D 55/2262 188/73.31 |
| 4,840,255 A | * | 6/1989 | Murakami | F16D 55/226 188/73.31 |
| 7,905,334 B2 | * | 3/2011 | Reuter | F16D 55/227 188/73.31 |
| 2001/0032757 A1 | * | 10/2001 | Ballinger | B60T 8/3275 188/71.1 |
| 2006/0219490 A1 | * | 10/2006 | Eisengraber | F16D 55/02 188/71.1 |
| 2007/0246312 A1 | * | 10/2007 | Bach | F16D 65/0975 188/73.31 |

FOREIGN PATENT DOCUMENTS

| | | | | |
|---|---|---|---|---|
| DE | 4236684 A1 | * | 5/1994 | .......... F16D 55/227 |
| GB | 2114691 A | * | 8/1983 | .............. B61H 5/00 |

* cited by examiner

*Primary Examiner* — Robert A Siconolfi
*Assistant Examiner* — San Aung
(74) *Attorney, Agent, or Firm* — Quinn Law Group, PLLC

(57) ABSTRACT

A brake assembly includes a brake pad, a bracket supporting the brake pad and having a first portion, a second portion spaced apart from the first portion, and a linkage interconnecting the first and second portions. The linkage is configured to transfer tensile loads between the first and second portion, but is characterized by the absence of any bending modes. The absence of bending modes prevents excitation of the linkage, thereby reducing sound generated during application of the brake assembly.

18 Claims, 2 Drawing Sheets

BRAKE ASSEMBLY

CROSS REFERENCE TO RELATED APPLICATION

This application is a divisional application of U.S. patent application Ser. No. 12/794,815, filed Jun. 7, 2010, and which is hereby incorporated by reference in its entirety.

TECHNICAL FIELD

This invention relates to vehicle brake assemblies.

BACKGROUND OF THE INVENTION

A disc brake assembly typically includes a rotor and a caliper. The rotor is connectable to a hub of a rotatable axle. The caliper includes a mutually opposed pair of brake pads supported by a bracket. Each of the brake pads overlies a respective rotor braking surface. Normally, the caliper keeps the brake pads separated from the braking surfaces of the rotor. The braking system is activated by moving the pads into contact with the braking surfaces of the rotor; frictional interaction between the braking surfaces and the pads reduces or prevents rotation of the rotor relative to the caliper.

Brake squeal may be the result of modal excitations of the disc brake rotor (composed usually of cast iron) and the disc brake caliper by the frictional interaction of the brake pads. Countermeasures to reduce low-frequency brake squeal include increasing the stiffness of the caliper bracket by increasing the cross-sectional area of the tie-bars, and casting in or mechanically attaching a mass to the caliper bracket, wherein the mass acts as a vibration damper and/or changes the dynamic response of the caliper bracket.

SUMMARY

A brake assembly includes a brake pad, a bracket supporting the brake pad and having a first portion, a second portion spaced apart from the first portion, and a linkage interconnecting the first and second portions. The linkage is configured to transfer tensile loads between the first and second portion, but is characterized by the absence of any bending modes. The absence of bending modes prevents excitation of the linkage, thereby reducing sound generated during application of the brake assembly.

The above features and advantages and other features and advantages of the present invention are readily apparent from the following detailed description of the best modes for carrying out the invention when taken in connection with the accompanying drawings.

DETAILED DESCRIPTION

Figure 1:
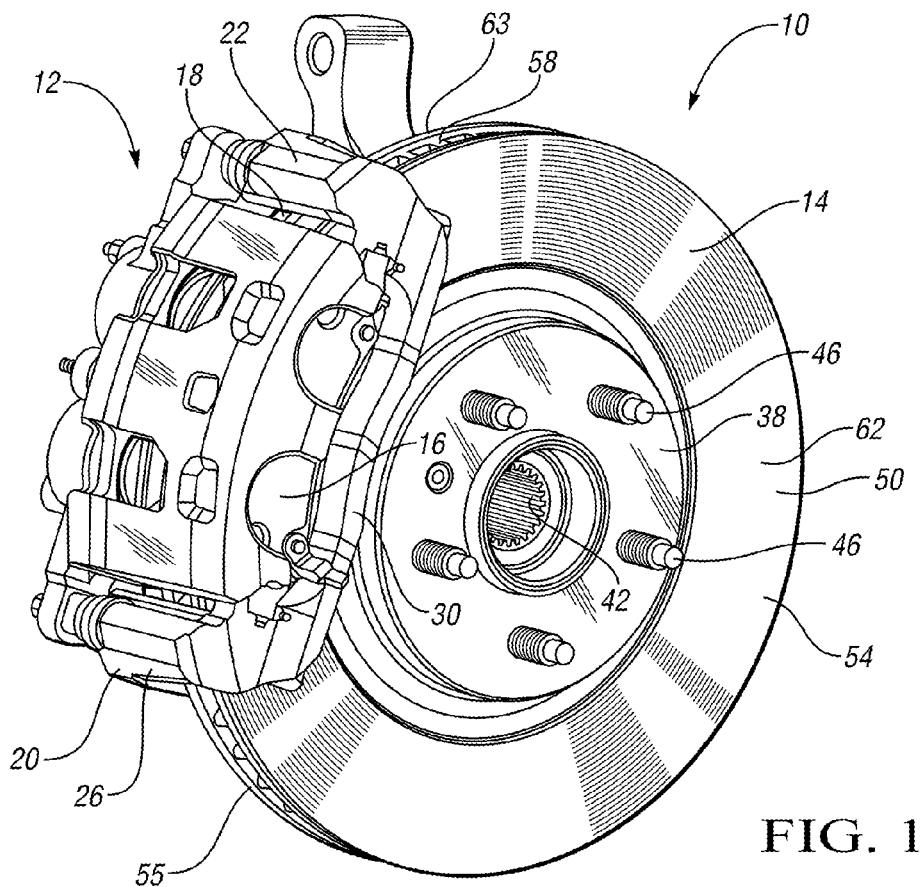
FIG. 1 is a schematic, perspective view of a brake assembly having a caliper assembly with a bracket.
Figure 2:
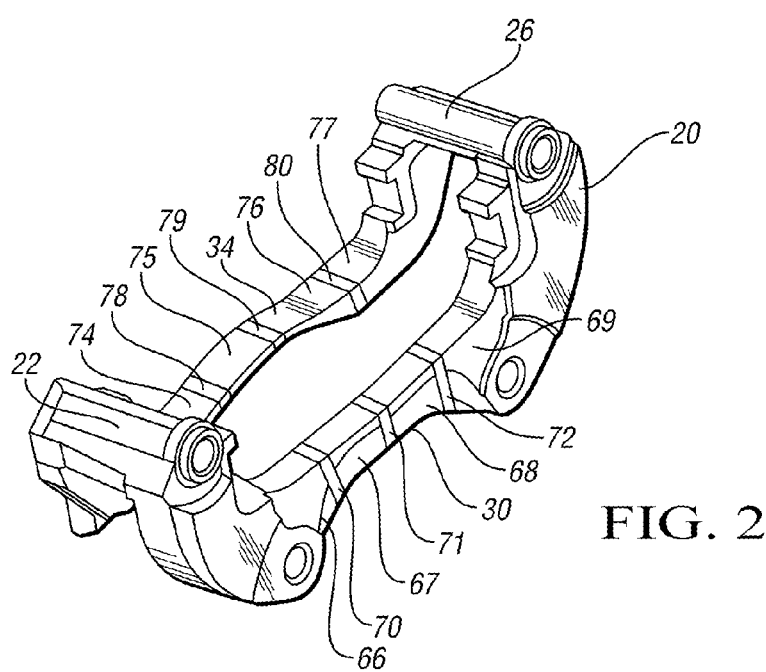
FIG. 2 is a schematic, perspective view of the bracket of FIG. 1.

Referring to FIG. 1, a brake assembly 10 includes a caliper assembly 12 and a rotor 14. The caliper assembly 12 includes first and second brake pads 16, 18, which are supported by a bracket 20. Referring to FIGS. 1 and 2, the bracket 20 is generally U-shaped, and includes a first portion 22, a second portion 26 spaced apart from the first portion 22, a first tie-bar linkage 30, and a second tie-bar linkage 34. The linkages 30, 34 interconnect the first and second portions 22, 26.

The rotor 14 in the embodiment depicted includes an inner portion 38 that is generally ring-shaped. The inner portion 38 defines a center hole 42 at which the rotor 14 is mountable to an axle (not shown), as understood by those skilled in the art. The inner diameter of the rotor 14 at the hole 42 includes splines as shown for engagement with complementary splines on the axle. The inner portion 38 also has a plurality of threaded studs 46 protruding therefrom. As understood by those skilled in the art, a wheel (not shown) is mountable to the rotor 14 at the studs 46 such that the wheel and rotor 14 rotate as a unit.

The rotor 14 also includes an outer portion 50, which is generally ring-shaped and which concentrically surrounds the inner portion 38. The outer portion 50 includes two opposing rotor cheeks 54, 55 having ventilation vanes 58 therebetween. Each rotor cheek 54, 55 defines a respective braking surface 62, 63.

Each of the brake pads 16, 18 overlies a respective rotor cheek braking surface 62, 63, i.e., the pads 16, 18 are positioned such that portions of the rotor cheeks 54, 55 are therebetween. The pads 16, 18 are selectively movable between engaged and disengaged positions, as understood by those skilled in the art. When the pads 16, 18 are in their disengaged positions, they do not contact the braking surfaces 62, 63, and therefore do not cause any resistance to the rotation of the rotor 14 and the wheel attached thereto. When the pads 16, 18 are in their engaged positions, each of the pads 16, 18 contacts a respective braking surface 62, 63, thereby resisting rotation of the rotor 14 and the wheel attached thereto. The pads 16, 18 may be moved to their engaged positions through hydraulic actuation, electronic actuation, etc., as understood by those skilled in the art. The rate of braking is dependent upon the pressure of the brake pads 16, 18 against the braking surfaces 62, 63.

Figure 3:
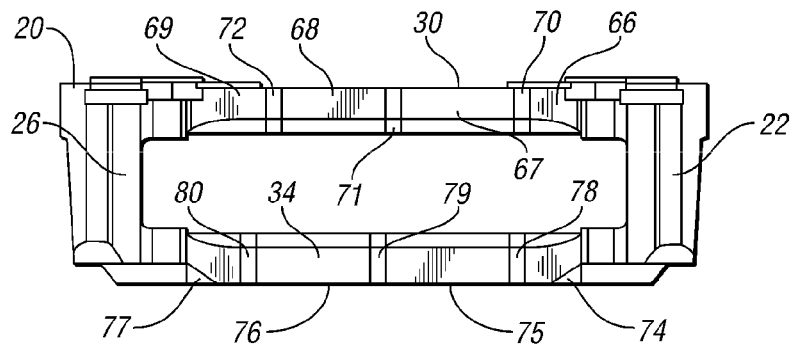
FIG. 3 is a schematic, top view of the bracket of FIG. 1.

The linkages 30, 34 are configured to support tensile loads between the first and second portions 22, 26, but will not support a bending mode. More specifically, and with reference to FIGS. 2 and 3, linkage 30 includes first, second, third, and fourth generally rigid links 66, 67, 68, 69. The first link 66 is substantially rigidly connected to the first portion 22; the fourth link 69 is substantially rigidly connected to the second portion 26.

The linkage 30 also includes one or more joints. More specifically, in the embodiment depicted, the linkage 30 includes joints 70, 71, and 72. Joint 70 operatively connects link 67 to link 66; joint 71 operatively connects link 67 to link 68; and joint 72 operatively connects link 68 to link 69.

Similarly, linkage 34 includes first, second, third, and fourth generally rigid links 74, 75, 76, 77. The first link 74 is substantially rigidly connected to the first portion 22; the fourth link 77 is substantially rigidly connected to the second portion 26.

The linkage 34 also includes one or more joints. More specifically, in the embodiment depicted, the linkage 34 includes joints 78, 79, and 80. Joint 78 operatively connects link 75 to link 74; joint 79 operatively connects link 75 to link 76; and joint 80 operatively connects link 76 to link 77.

Figure 4:
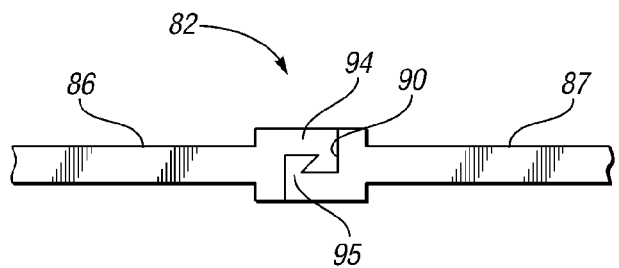
FIG. 4 is a joint for use with the bracket of FIG. 1.

FIG. 4 schematically depicts a joint 82 interconnecting a first link 86 and a second link 87. Joint 82 may be representative of joints 70, 71, 72 and joints 78, 79, 80, and links 86, 87 may be representative of links 66, 67, 68, 69 and links 74, 75, 76, 77. Referring to FIG. 4, links 86 and 87 are formed from a single piece of material in which a void 90 has been formed to separate the single piece of material into the two links 86, 87. The void 90 in the embodiment depicted is configured such that link 86 defines a first hook portion 94 and link 87 defines a second hook portion 95 that interlock with each other to support a tensile load between links 86 and 87, while preventing bending modes.

Figure 5:
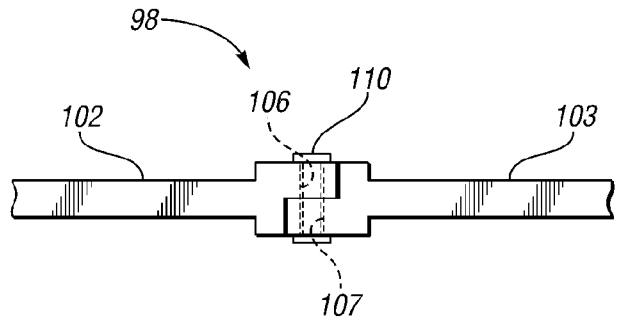
FIG. 5 is another joint for use with the bracket of FIG. 1.

FIG. 5 schematically depicts another joint 98 interconnecting a first link 102 and a second link 103. Joint 98 may be representative of joints 70, 71, 72 and joints 78, 79, 80, and links 102, 103 may be representative of links 66, 67, 68, 69 and links 74, 75, 76, 77. Joint 98 is a hinge about which link 103 is rotatable with respect to link 102. More specifically, in the embodiment depicted, link 102 defines a hole 106. Link 103 defines a hole 107. Holes 106 and 107 are aligned with one another, and a hinge pin 110 extends therethrough. Hinge pin 110 limits movement of link 103 with respect to 102 to rotation. Accordingly, when the links 102, 103 are at a 180 degree angle with respect to one another, the joint 98 supports a tensile load, but will not support a moment. Accordingly, the linkage formed by links 102, 103 does not have any bending modes.

Figure 6:
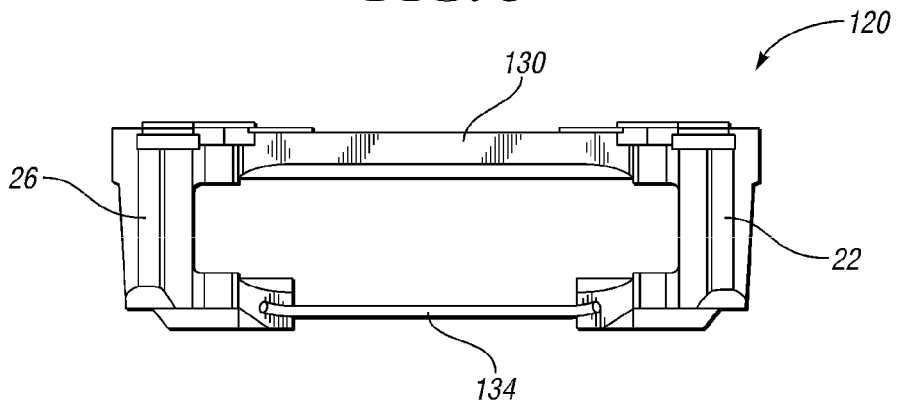
FIG. 6 is an alternative bracket configuration for use with the brake assembly of FIG. 1.

Referring to FIG. 6, wherein like reference numbers refer to like components from FIGS. 1-5, an alternative bracket 120 for use in the caliper assembly 12 of FIG. 1 is schematically depicted. Bracket 120 includes first and second portions 22, 26 interconnected by linkages 130, 134. Linkages 130, 134 are configured to transmit tensile loads between the first and second portions 22, 26. Linkage 130 is a single piece of substantially rigid material in the embodiment depicted. Linkage 134 is a flexible member and, more particularly, a segment of cable in the embodiment depicted. Accordingly, linkage 34 is unable to support a compressive load or a moment, and is thus characterized by the absence of any bending modes.

Brake squeal is the result of excitation of either the brake rotor 14 or the caliper bracket 20, 120. The caliper bracket modes that typically generate brake squeal are the bending modes of the caliper linkages. Accordingly, the brackets 20, 120 may result in reduced brake squeal because the linkages 30, 34, 134 do not have any bending modes.

While the best modes for carrying out the invention have been described in detail, those familiar with the art to which this invention relates will recognize various alternative designs and embodiments for practicing the invention within the scope of the appended claims.

The invention claimed is:

1. A brake assembly comprising:
a brake pad;
a bracket supporting the brake pad and having a first portion, a second portion spaced apart from the first portion, and a linkage interconnecting the first and second portions;
wherein the linkage is configured to transfer tensile loads between the first and second portion; and
wherein at least part of the linkage is unable to support a bending moment.

2. The brake assembly of claim 1, wherein the linkage includes a first rigid link, a second rigid link, and a joint that interconnects the first rigid link and the second rigid link.

3. The brake assembly of claim 2, wherein the joint is a hinge about which the first rigid link is selectively rotatable about the second rigid link.

4. The brake assembly of claim 1, wherein the linkage includes a flexible member.

5. The brake assembly of claim 4, wherein the flexible member is a cable.

6. The brake assembly of claim 1, further comprising a brake rotor; wherein the brake pad is selectively movable between a disengaged position in which the brake pad does not contact the rotor, and an engaged position in which the brake pad contacts the rotor.

7. A brake assembly comprising:
first and second brake pads;
a bracket supporting the first and second brake pads and having a first portion, a second portion spaced apart from the first portion, and first and second linkages interconnecting the first and second portions;
wherein the first linkage is configured to transfer tensile loads between the first and second portion; and
wherein at least part of the first linkage is unable to support a bending moment.

8. The brake assembly of claim 7, wherein the first linkage includes a first rigid link, a second rigid link, and a joint that interconnects the first rigid link and the second rigid link.

9. The brake assembly of claim 8, wherein the joint is a hinge about which the first rigid link is selectively rotatable about the second rigid link.

10. The brake assembly of claim 7, wherein the first linkage includes a flexible member.

11. The brake assembly of claim 10, wherein the flexible member is a cable.

12. The brake assembly of claim 7, further comprising a brake rotor at least partially disposed between the first and second brake pads.

13. The brake assembly of claim 7, wherein the second linkage is configured to transfer tensile loads between the first and second portion; and
wherein the second linkage is configured such that at least part of the second linkage is unable to support a bending moment.

14. A brake assembly comprising:
a brake pad;
a bracket supporting the brake pad and having a first portion, a second portion spaced apart from the first portion, and first and second linkages interconnecting the first and second portions in a spaced relationship such that the linkages and the portions cooperate to present an opening therebetween;
wherein the first linkage is configured to transfer tensile loads between the first and second portion; and
wherein at least part of the first linkage is unable to support a bending mode.

15. The brake assembly of claim 14, wherein the first and second linkages are each directly connected to the first and second portions such that the linkages are disposed between the first and second portions.

16. The brake assembly of claim 14, further comprising a brake rotor at least partially disposed in the opening between the linkages and the portions.

17. The brake assembly of claim 1, wherein the linkage is directly connected to the first and second portions, with the linkage and the portions cooperating to define a generally u-shaped configuration.

18. The brake assembly of claim 1, wherein the linkage is disposed between the first and second portions.

* * * * *